J. STOCK.
Camera.
No. 24,671.
Patented July 5, 1859.
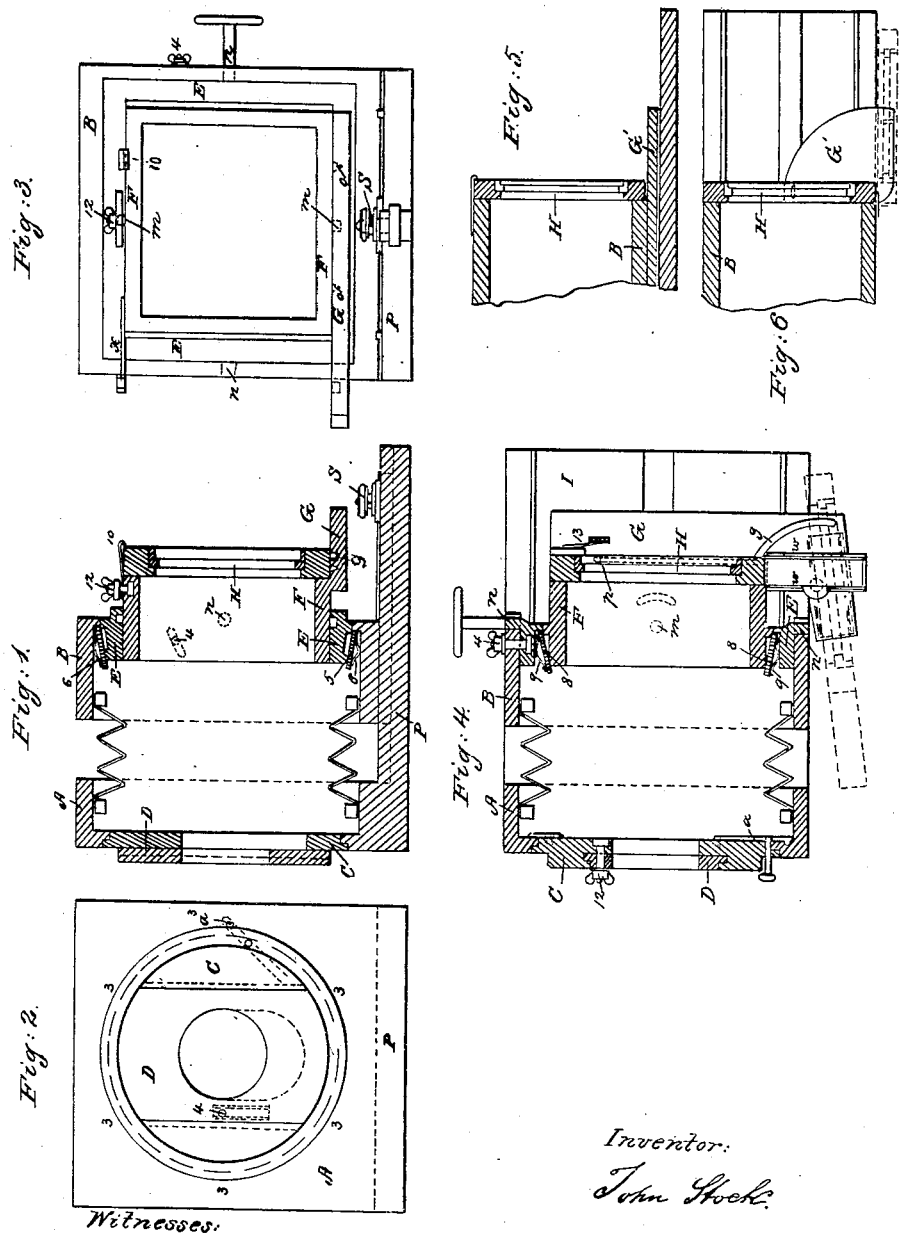
Inventor:
John Stock.
Witnesses:
Henry E. Binder
James H. Elgar.

UNITED STATES PATENT OFFICE.

JOHN STOCK, OF NEW YORK, N. Y.

PHOTOGRAPHIC CAMERA.

Specification of Letters Patent No. 24,671, dated July 5, 1859.

*To all whom it may concern:*

Be it known that I, JOHN STOCK, of New York, in the county and State of New York, have invented a new and Improved Camera; and I do hereby declare that the following is a full and exact description thereof, reference being had to the accompanying drawings and to the letters of reference marked thereon.

Figure I represents a longitudinal section of my improved camera—Fig. II is a front view—Fig. III a back view and Fig. IV a horizontal section of the same—Fig. V represents a longitudinal section and Fig. VI a horizontal section of part of a common camera showing the manner of fastening the ground glass plate holder.

Similar letters represent similar parts.

The nature of my invention consists first in the arrangement of the front plate of the camera, to which the lens tube is attached, by which the center of said tube can be changed, and brought upon any point desired; secondly in the arrangement of the after part of the camera where the plate holder is fixed, in such a manner that the plane of the plate, may be brought in a position corresponding with the plane of the picture to be taken, and thirdly in the manner of attaching the frame, containing the ground glass, permanently to the camera.

A is the front part of the camera fast to the bottom plate P, and attached to the after part of the camera B, in the usual manner to exclude the light, and to allow the distance to be increased or diminished as may be required. The after part B is made to slide for that purpose on the bottom plate P and is secured by means of the screwbolt S, in the desired position.

The front side of the forward box A is provided with a circular plate, C, made to turn either way and held in any position by the spring, *a*, the pointed end of which fits into holes, 3, made on the inner side of the box.

D, is a slide fitting in grooves in the circular plate, C, and held fast in any position by means of the bolt, 2. The tube containing the lenses is attached to this slide D, and as this slide as described can be moved on the plate, C, and said plate, C, is made to turn in the front side, the position or center of the tube may be varied so as to bear upon any point of the picture desired, and is then fastened in this position by the spring, *a*, and by the screw or bolt, 2.

E is a square frame fitting tight on the sides in the after box B and capable of turning on the horizontal axles *n*, *n*, in bearings fast on the sides of the box B, and held in any desired position by means of the bolt, 4. The top and bottom of this frame, E, are rounded off and form part of a circle, with the center of the axles as radius. Against this rounded part, plates 5, 5 are laid, fitting in recesses provided in the top and bottom of the box, and acted on by springs, 6, through which said plates are always pressed tight against the circumference of the frame, to prevent the light entering the inner side of the box when the position of the frame is changed.

F is a frame constructed similar to the frame E but turning on perpendicular axles *m*, *m*, in bearings provided in the frame E. The top and bottom of this frame F fit tight in the frame E and the sides form part of a circle, against which plates 8, 8, situated in recesses on the frame E, and acted on by springs, *g*, are made to press, to prevent the light entering the inner side of the box or camera.

The centers of the horizontal axle *n*, *n*, of the frame E, and of the perpendicular axles *m*, *m*, of the frame F are situated in one and the same plane.

The after part of the frame F is built out some distance and provided with a projecting plate, G, at the bottom.

The plate holder, containing the prepared plate on which the picture is to be taken, and which is constructed in the usual manner, fits against the end of the projected part of the frame F and is held fast by the spring, 10, fast to said frame F, and by projections on the plate holder entering the holes, *o*, *o*, in the plate G. By this arrangement the plane of the plate, upon which the picture is to be taken, can be always brought in a line with the plane of the object to be taken, as the afterpart of the camera can, by the above described arrangement, be moved horizontally as well as perpendicularly the great advantage of which will be readily perceived if we consider that in most cases the camera has to be placed some distance to obtain the proper focus and in very few cases can be placed in that distance in a direct line and square with the plane of the object.

The frame F is held fast in the desired position by means of the bolt, 12.

H is a frame containing the ground glass used for the purpose of reflecting the picture so as to regulate the camera in the beginning. This frame is generally attached to the camera similar to the frame which contains the plate upon which the picture is taken, and has in that case after being used, to be put aside.

My improvement consists in attaching said frame permanently to the camera in such a manner as to be easily moved out of the way and arranged in such a manner that when moved on one side the same will be supported in such a manner that every detrimental strain arising from its weight shall be taken of the camera by supporting it, at or near its center of gravity. For this purpose I provide small frames, $w$, the lower one of which turns on the plate G and the upper one in an arm $x$ fast on the top of the frame, F, and in which said frames, $w$, the holder H is made to slide, and to turn with said frames, $w$. The holder H is further guided by the projection, $p$, working in the groove, $g$, provided in the bottom plate, G, and is held fast against the face of the frame F when in use by the action of the springs 13 and 14. After said frame H has been used it is moved back in the frames, $w$, and then turned around on the centers of said frame while the weight is supported by the projecting part of the plate G, preventing thereby any strain on the camera.

Instead of arranging the frame H as above described the same may be hinged to the end of the camera as represented in Figs. V and VI, and the lower side supported on a plate, G′, attached to the bottom of the afterpart of the camera B.

What I claim as my invention and desire to secure by Letters Patent is—

1. The arrangement of the front plate of a camera, to which the lens tube is attached in such a manner that the center of the tube may be moved in any desired position for the purpose as described, and in the manner substantially as specified.

2. I claim the arrangements of the plates 5 and 8 for the purpose described.

3. I claim attaching the ground glass holder to the end of the camera and the manner of supporting the weight of the same substantially as specified.

JOHN STOCK.

Witnesses:
HENRY E. ROEDER,
JAMES W. ELGAR.